June 29, 1965 P. MAINARDI ETAL 3,191,493
STEREOSCOPIC IMAGE-PROJECTING SYSTEM AND
METHOD FOR ALIGNMENT OF IMAGES
Filed Jan. 7, 1963
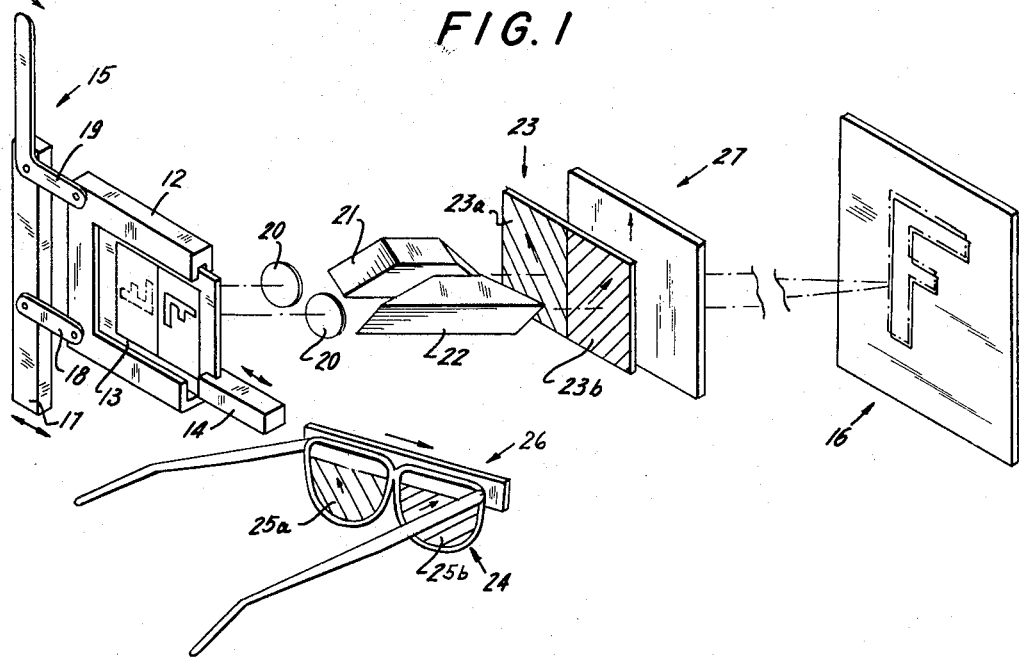
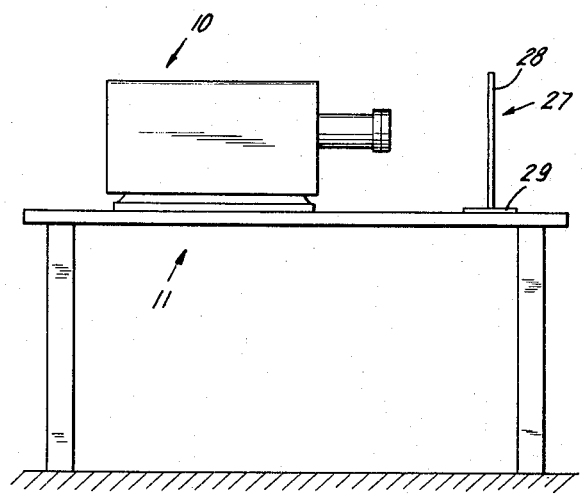
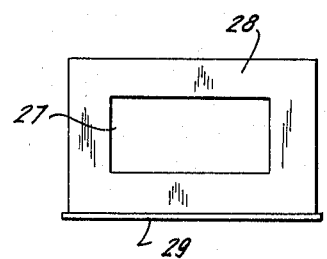
INVENTORS
Pompey Mainardi
Marcus N. Mainardi
BY
Michael S. Striker,
Attorney

3,191,493
STEREOSCOPIC IMAGE-PROJECTING SYSTEM AND METHOD FOR ALIGNMENT OF IMAGES
Pompey Mainardi, 65 Gibson Place, Glen Rock, N.J., and Marcus N. Mainardi, 8—25 Henderson Blvd., Fair Lawn, N.J.
Filed Jan. 7, 1963, Ser. No. 249,660
14 Claims. (Cl. 88—26)

The present invention relates to the art of photography.

More particularly, the present invention relates to the projection of stereoscopic images.

As is well known, projectors of stereoscopic images are capable of providing on a screen or the like a pair of images which when viewed through suitable spectacles, for example, are capable of giving a desired three-dimensional effect.

As the operator of such a projector inserts one slide after another, it is necessary to accurately align on the viewing screen the images which are projected to the screen from the slide which is located at the back focal plane of the projector. This necessity of aligning the images so that they are properly superimposed on each other gives rise to certain difficulties which thus far have not been satisfactorily overcome.

Thus, the viewing of the images during their alignment cannot very well be avoided unless special measures are taken, and as a viewer views the images during their alignment eyestrain will result because of the following of a pair of separate images by the separate eyes of each viewer during the alignment of these images with each other. This difficulty is particularly apparent when the images at the back focal plane of the projector have an oppositiaxial relationship with respect to each other (that is, corresponding parts of the stereo images are symmetrically located with respect to a point on the line of abutment of the stereo images), since in this case the pair of images move onto the screen from opposed parts thereof, and in this case eyestrain will result if special measures are not taken, although eyestrain will also inevitably result in the case where both images move onto the screen from the same part thereof and these images are then aligned on the screen itself.

Various measures have already been proposed to overcome this problem. For example, where the projector includes means for providing a pair of polarized beams which have a certain angle with respect to each other, it has been proposed to provide the projector with a structure for changing the position of the polarizers so that they will not match the polarizing elements in the spectacles worn by the viewers, and the images are aligned during this mismatch between the polarizers of the projector and the spectacles of the viewers, and after the operator aligns the images, he returns the polarizing elements of the projector to their proper position matching the polarizing elements of the spectacles so that the image will then be viewed properly. This construction has the fault of being exceedingly complex and costly and requiring a considerable amount of work on the part of the operator who must repeatedly adjust the polarizing elements of the projector.

In order to avoid the complexities involved in this latter solution to the problem, it has also been proposed to temporarily position in front of the projector an additional sheet of polarizing material which renders the images on the screen unintelligible while the operator aligns the images whereupon the operator then removes this additional sheet of polarizing material. However, the result of placing this additional sheet of polarizing material in front of the projector is to suddenly decrease the light intensity of the images so that the viewers are subjected to sudden changes in light intensity whenever the images of a given slide are adjusted with respect to each other, and these sudden changes in light intensity are exceedingly disturbing to the viewers.

It has been found from experience that it simply does not help to instruct the viewers not to look at the screen during the adjustment of the images. Such viewing of the images is unavoidable, and thus far in order to prevent discomfort to the viewers it is necessary to resort either to extremely complex and expensive mechanism requiring an undesirable amount of work on the part of the operator or to structure which provides sharp and substantial changes in the light intensity of the images which is also equally uncomfortable to the viewers and which makes the job of the operator more difficult.

It is accordingly a primary object of the present invention to provide a method and apparatus which will avoid the above drawbacks while at the same time being extremely simple and inexpensive, requiring only a minimum amount of work on the part of the operator, and providing no sudden changes in the light intensity of the images.

It is also an object of the present invention to provide a method and apparatus of the above type which make it possible for the operator of the projector to preview the images as they will be seen by the viewers of the screen after the images have ben aligned but before they are rendered intelligible to the viewers of the screen or the like.

A further object of the present invention is to provide a method and apparatus of the above type which is particularly suitable for the projection of a pair of oppositiaxial stereoscopic images.

With these objects in view, the invention includes, in a stereoscopic image-projecting system, a projector for projecting a pair of stereo images and including a first polarizing means for producing a first pair of plane-polarized beams whose axes of polarization are at 90° with respect to each other, so that the stereo images when properly superimposed on a screen or the like can be viewed through a second polarizing means providing the same angular relationship between the axes of a pair of plane-polarized beams reaching the eyes of a viewer viewing the images. In accordance with the present invention, a movable means, which may take the form of a quarter-wave plate, is movable to and from a position located in the path of the first polarized beams so that when this movable means is in this position it will alter the first polarized beams to present to the viewer unintelligible images while maintaining substantially the same intensity of illumination of the images, so that the thus-altered beams provide images which can be aligned by the operator and then presented to the viewers after the movable means is moved away from its position in the path of the first pair of polarized beams.

The process of the present invention includes the step of holding in front of a projector of the above type a quarter-wave plate whose axis makes an angle of 45° with respect to the perpendicular axes of the pair of plane-polarized beams produced by the projector, so that the images resulting from beams which pass through the quarter-wave plate can be aligned without in any way disturbing the viewers of these images during their alignment, and thereafter the quarter-wave plate is removed from its position in front of the projector to present a properly aligned pair of stereo images to the viewers.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a diagrammatic, perspective illustration of the apparatus and method of the present invention;

FIG. 2 is a diagrammatic side elevation of the structure of the invention; and

FIG. 3 is a view of a quarter-wave plate and support therefor of FIG. 2 as seen from the right of FIG. 2.

The structure of the invention includes a stereo projector 10 indicated diagrammatically in FIG. 2 and carried, as shown in FIG. 2, by any suitable support such as the table 11. The details of the projector 10, so far as they pertain to the present invention, are indicated diagrammatically in FIG. 1. Thus, as may be seen from FIG. 1, the projector includes a slide carrier 12 which is capable of removably supporting, at the back focal plane of the projector, a diapositive in the form of a slide 13 which in the illustrated example has a pair of oppositiaxial stereoscopic images which abut each other along a vertical line, as indicated in FIG. 2. FIG. 2 diagrammatically illustrates a holder 14 which engages the slide 13 for moving the latter horizontally along the guides of the carrier 12. A suitable trimming means 15 is provided for adjusting the pair of images which appear on the screen 16, and this trimming means 15 includes an upright member 17 capable of being moved by the operator horizontally and pivotally connected to a pair of links 18 and 19 which are in turn pivotally connected to the carrier 12, so that the carrier 12 and the member 17 are connected to each other through a parallelogram linkage. The link 19 is in the form of a bell crank having an upwardly extending arm accessible to the operator so that by turning the link 19 the elevation of the carrier 12 can be adjusted while by shifting the member 17 horizontally, this member 17 being supported in any suitable guides for this purpose, the carrier 12 can be adjusted horizontally, and in this way the pair of images projected onto the screen 16 can be aligned until they are in proper superposition.

The projector includes, in addition to the usual lamp, condenser lenses, fan, etc., which are not illustrated, a pair of objectives 20 which are conventional and through which the light which passes through the pair of oppositiaxial sterescopic images is directed to a pair of dove prisms 21 and 22. These dove prisms 21 and 22 are positioned with their bases oppositely inclined and respectively located in planes which make a right angle with each other, and these planes make an angle of 45° with a vertical line, each of the dove prisms having a trapezoidal configuration at its side faces, and the opposed side faces of each dove prism are identical and are aligned with each other. The light which passes through the dove prisms is acted upon so as to provide on the screen from the images in the back focal plane of the projector a pair of images which are right side up and superimposed, and the trimming means 15 is manipulated to align these images precisely with respect to each other.

The projector also includes a polarizing means 23 located in front of the pair of dove prisms and the light beams which pass through and beyond the dove prisms then pass through the polarizing means 23 to the screen 16. The polarizing means 23 includes a pair of polarizing elements 23a and 23b which respectively receive the light beams after they pass beyond the pair of dove prisms 21 and 22, and the axes of the pair of polarizing elements 23a and 23b make an angle of 90° with respect to each other, as is apparent from the arrows in FIG. 1, so that in this way the polarizing means 23 will provide a pair of plane-polarized beams whose axes are at 90° with respect to each other.

The superimposed images on the screen 16 are capable of being viewed through a pair of spectacles 24 which carry for the eyes of the viewer a pair of polarizing elements 25a and 25b whose axes respectively match the axes of the polarizing elements 23a and 23b, so that the pair of spectacles 24 provide a second polarizing means giving the same angular relationship between a second pair of plane-polarized beams which reach the eyes of a viewer viewing the images on the screen 16.

The particular pair of spectacles shown in FIG. 1 include a strip of sheet material 26 described below and adapting these spectacles for use by the operator, but the viewers of the screen 16 have spectacles identical with those of FIG. 1 except that they do not have the strip 26 and instead have the polarizing sheets 25a and 25b covering the entire apertures of the pair of spectacles.

With the above-described structure it is possible for the operator to insert a slide into the carrier 12, to properly align the images by manipulation of the trimming means 15, and the viewers will then see the superimposed images with the desired three-dimensional effect. However, as has been indicated above, the movement of the images into alignment with each other will provide undesirable eyestrain, and with the invention this drawback is avoided.

In accordance with the invention a movable means 27 is capable of being moved by the operator to and from the position shown in FIG. 1 where it is in front of the projector. This movable means will alter the light beams after they pass through the polarizing means 23 in such a way that the images on the screen 16 will be overlaid and unintelligible to a viewer looking at these images through the elements 25a and 25b of the spectacles 24. Thus, the viewer simply will pay no attention to the scrambled and unintelligible images, but at the same time the operator of the projector can identify parts of the images so as to align them precisely with respect to each other, and then the movable means 27 is simply moved away from its position in front of the projector to provide precisely superimposed images which then become recognizable to the viewers.

The movable means 27 takes the form of a quarter-wave plate whose axis extends perpendicularly, as indicated by the arrow in FIG. 1, so that the axis of the quarter-wave plate is at an angle of 45° with respect to the mutually perpendicular axes of the pair of polarizing elements 23a and 23b. The quarter-wave plate has the advantage not only of scrambling the images so that they will be unintelligible to the viewers, but in addition there is not any appreciable reduction in the light intensity by placing the quarter-wave plate 27 in front of the projector, so that the viewers are not subjected to the discomfort resulting from sudden changes in light intensity. This quarter-wave plate 27 can simply be in the form of a sheet which is held in the hand of the operator in front of the projector during alignment of the images and then simply removed from in front of the projector when the images are properly aligned. The effect of placing in front of the polarizing means 23 a quarter-wave plate 27 whose axis makes an angle of 45° with respect to the mutually perpendicular axes of the plane-polarized pair of beams produced by the polarizing means 23 is to convert the pair of plane-polarized beams into a pair of circularly polarized beams whose senses of polarization are opposite to each other. Thus, the quarter-wave plate 27 will cooperate with one of the plane-polarized beams to convert it into a right-hand circularly polarized beam and with the other plane-polarized beam to convert it into a left-hand circularly polarized beam, and in this way the images projected onto the screen 16 with light passing through the quarter-wave plate 27 are rendered unintelligible to the viewers without any appreciable diminution of light intensity.

The particular pair of spectacles shown in FIG. 1 is adapted to be worn by the operator of the projector and it includes a strip 26 of a quarter-wave plate, this strip 26 being fastened to the spectacles and extending across the upper portions of the apertures thereof, the polarizing elements 25a and 25b of the particular pair of spectacles shown in FIG. 1 having upper edges located in alignment with the lower edge of the quarter-wave plate 26 which is fixed to these spectacles 24. The axis of the quarter-wave plate 26 is perpendicular to the axis of the quarter-wave plate 27, and the spectacles 24 are used in the manner of bifocal spectacles so that the operator can tilt the spectacles down in order to look at the images on the screen 16 through the quarter-wave plate 26 and then by raising his head the operator can look at the images through the polarizing sheets 25a and 25b. Because the axis of the quarter-wave plate 26 is perpendicular to that of the plate 27, when the operator views the images on the screen 16 resulting from the circular polarization of the quarter-wave plate 27 through the quarter-wave material 26, he will see these images in 3-D precisely as they will subsequently be seen by the viewers when the plate 27 is removed from its position in front of the projector. Therefore, by viewing the images on the screen through the quarter-wave material 26 before the plate 27 is removed from its position in front of the projector, the operator can preview the superposition of the images, can more readily focus the projector, and can see the images exactly as they will appear subsequently to the viewers, in order to check the alignment of the images, and assuming that they are properly aligned the operator will then simply move the quarter-wave plate 27 away from its position in front of the projector.

As is indicated in FIG. 2, the quarter-wave plate 27 is carried by a suitable frame 28 also shown in FIG. 3, and this frame 28 is supported vertically on a suitable base member 29 which can slide on the top of the table 11 so that the operator can simply shift the quarter-wave plate 27 manually to and from its position in the path of the plane-polarized beams passing through the pair of polarizing sheet portions 23a and 23b.

While the above-described structure is preferred, because it is an extremely simple matter to provide an operator with an inexpensive quarter-wave plate 27 which he can simply manually move to and from its position in front of the projector as well as with the quarter-wave material 26 attached to a spectacle frame, it is also possible, instead, to replace the plane-polarizing means 23a, 23b of the projector and polarizing elements 25a, 25b of the spectacles by corresponding circularly polarizing elements to produce the same effect when the quarter-wave material 26 and 27 is employed as described above.

With the particular construction shown in FIG. 1, the images moving onto the screen 16 will respectively move vertically from the top and bottom of the screen toward the center thereof during insertion of the slide, and the disturbing effect which would be provided to the viewers without the invention is completely eliminated through the use of the quarter-wave plate 27 while at the same time the viewers are not subjected to sudden, sharp changes in light intensity.

It should be noted that it is not essential that the quarter-wave plate 27 be positioned with its axis making an angle of precisely 45° with the mutually perpendicular axes of the pair of plane-polarized beams produced by the polarizing means 23. With the structure as shown in FIGS. 2 and 3, this precise relationship will be provided. However, where the quarter-wave plate 27 is simply held in the hand of the operator, it need only be positioned with its axis approximating an angle of 45° with respect to the axes of the pair of plane-polarized beams, and the operator will be able to accurately align the images. Since the quarter-wave plate 27 is rectangular with its axis extending perpendicular to one of its edges, it is a simple matter for the operator to approximate the proper position of the plate 27 while holding it manually in front of the projector.

It will be understood that each of the elements described above, or two or more together, may also find a useful application in other types of projectors differing from the types described above.

While the invention has been illustrated and described as embodied in stereo projectors, it is not intended to be limited to the details shown, since various modifications and structural changes may be made without departing in any way from the spirit of the present invention, as defined in the claims.

What is claimed as new and desired to be secured by Letters Patent is:

1. In a stereoscopic image-projecting system, in combination, a projector for projecting a pair of stereo images, said projector including a first polarizing means for producing a first pair of polarized beams whose axes have a predetermined angular relationship with respect to each other, so that the stereo images when accurately superimposed on a screen or the like can be viewed through a second polarizing means providing the same angular relationship between a second pair of beams reaching the eyes of a viewer viewing the images; and movable means movable to and from a position located in the path of said first polarized beams, said movable means when in said position thereof altering said first polarized beams to present to the viewer unintelligible images while maintaining substantially the same intensity of illumination of the images, so that the images projected with the thus altered beams can be aligned by the operator and then viewed by the viewer after said movable means is moved away from said position thereof.

2. In a stereoscopic image-projecting system, in combination, a projector for projecting a pair of stereo images, said projector including a first polarizing means for producing a first pair of polarized beams whose axes having a predetermined angular relationship with respect to each other, so that the stereo images when accurately superimposed on a screen or the like can be viewed through a second polarizing means providing the same angular relationship between a second pair of beams reaching the eyes of a viewer viewing the images; movable means movable to and from a position located in the path of said first polarized beams, said movable means when in said position thereof altering said first polarized beams to present to the viewer unintelligible images while maintaining substantially the same intensity of illumination of the images, so that the images projected with the thus altered beams can be aligned by the operator and then viewed by the viewer after said movable means is moved away from said position thereof; and means accessible to the operator for cancelling the alteration of said first beams by said movable means so that the operator can view the aligned images in 3-D before they are viewed by a viewer looking at the images through said second polarizing means.

3. In a stereoscopic image-projecting system, in combination, a projector for projecting a pair of stereo images, said projector including a first polarizing means for producing a first pair of polarized beams whose axes have a predetermined angular relationship with respect to each other, so that the stereo images when accurately superimposed on a screen or the like can be viewed through a second polarizing means providing the same angular relationship between a second pair of beams reaching the eyes of a viewer viewing the images; support means; and movable means supported by said support means for movement to and from a position located in the path of said first polarized beams, said movable means when in said position thereof altering said first polarized beams to present to the viewer unintelligible images while maintaining substantially the same intensity of illumination of the images, so that the images projected with the thus altered beams can be aligned by the operator and then viewed by the viewer after said movable means is moved away from said position thereof.

4. In a stereoscopic system as recited in claim 2, said means accessible to the operator being in the form of an elongated strip of sheet material fixed to the upper portions of a pair of spectacles.

5. In a stereoscopic image-projecting system, in combination, a projector for projecting a pair of stereo images, said projector including a first polarizing means for producing a first pair of plane-polarized beams whose axes of polarization are at 90° to each other, so that the stereo images when accurately superimposed on a screen or the like can be viewed through a second polarizing means providing the same angular relationship between a second pair of plane-polarized beams reaching the eyes of a viewer viewing the images; and a quarter-wave plate movable to and from a position located in the path of said first polarized beams, said quarter-wave plate when in said position thereof altering said first beams to present to the viewer unintelligible images while maintaining substantially the same intensity of illumination of the stereo images, so that the images projected with the thus altered beams can be aligned by the operator and then viewed by the viewer when said quarter-wave plate is moved away from said position thereof.

6. In a stereoscopic image-projecting system, in combination, a projector for projecting a pair of stereo images, said projector including a first polarizing means for producing a first pair of plane-polarized beams whose axes of polarization are at 90° with respect to each other, so that the stereo images when accurately superimposed on a screen or the like can be viewed through a second polarizing means providing the same angular relationship between a second pair of plane-polarized beams reaching the eyes of a viewer viewing the images; and a quarter-wave plate movable to and from a position located in the path of said first polarized beams with the axis of said quarter-wave plate making an angle of 45° with respect to the axes of polarization of said first beams, said quarter-wave plate maintaining substantially the same intensity of illumination of the images while presenting to the viewer an unintelligible set of images, so that the images projected through the quarter-wave plate can be aligned by the operator and then subsequently viewed through the second polarizing means after said quarter-wave plate is moved away from said position thereof.

7. In a stereoscopic image-projecting system, in combination, a projector for projecting a pair of stereo images, said projector including a first polarizing means for producing a first pair of plane-polarized beams whose axes of polarization are at 90° with respect to each other, so that the stereo images when accurately superimposed on a screen or the like can be viewed through a second polarizing means providing the same angular relationship between a second pair of plane-polarized beams reaching the eyes of a viewer viewing the images; a quarter-wave plate movable to and from a position located in the path of said first polarized beams with the axis of said quarter-wave plate making an angle of 45° with respect to the axes of polarization of said first beams, said quarter-wave plate maintaining substantially the same intensity of illumination of the images while presenting to the viewer an unintelligible set of images, so that the images projected through the quarter-wave plate can be aligned by the operator and then subsequently viewed through the second polarizing means after said quarter-wave plate is moved away from said position thereof; and a second quarter-wave plate accessible to the operator and having an axis perpendicular to that of said first-mentioned quarter-wave plate so that the operator can view the images which are unintelligible to the viewer through said second quarter-wave plate before moving said first-mentioned quarter-wave plate away from said position thereof.

8. In a stereoscopic image-projecting system, in combination, a projector for projecting a pair of stereo images, said projector including a first polarizing means for producing a first pair of polarized beams, so that the stereo images when properly superimposed on a screen or the like can be viewed through a second polarizing means; and movable means movable to and from a position located in the path of said first polarized beams, said movable means when in said position thereof altering said first polarized beams to present to the viewer unintelligible images while maintaining substantially the same intensity of illumination of the images, so that the images projected with the thus altered beams can be aligned by the operator and then viewed by the viewer after said movable means is moved away from said position thereof.

9. In a stereoscopic image-projecting system, in combination, a projector for projecting, from the back focal plane of the projector, a pair of oppositiaxial stereoscopic images, said projector including a first polarizing means for producing a first pair of plane-polarized beams whose axes of polarization are at 90° with respect to each other, so that the stereo images when accurately superimposed on a screen or the like can be viewed through a second polarizing means providing the same angular relationship between a second pair of beams reaching the eyes of a viewer viewing the images; and a quarter-wave plate movable to and from a position located in the path of said first polarized beams with the axis of said quarter-wave plate making an angle of 45° with respect to said axes of polarization of said first pair of polarized beams, so that when said quarter-wave plate is in said position thereof the images projected onto the screen or the like will be unintelligible to the viewer while being capable of being aligned by the operator who thereafter removes said quarter-wave plate from said position thereof to present the aligned images to a viewer viewing the screen through said second polarizing means.

10. In a system as recited in claim 9, said pair of oppositiaxial stereoscopic images being located on a diapositive, and said projector including means for moving said diapositive in its own plane in a direction perpendicular to the line of abutment between said pair of oppositiaxial images in said back focal plane of said projector.

11. In a method of projecting stereoscopic images, the steps of holding in front of a projector, which produces a pair of plane-polarized beams whose axes of polarization are at 90° to each other, a quarter-wave plate so that the beams will pass through said plate to provide on a screen or the like images which are unintelligible to viewers looking at the images through spectacles providing plane-polarized beams matching those of the projector, and then aligning said images whereby the images can be aligned by the operator without disturbing the eyes of the viewers of the images through said spectacles.

12. In a method as recited in claim 11, removing the quarter-wave plate from its position in front of said projector after the images are aligned.

13. In a method as recited in claim 12, said quarter-wave plate being held in front of the projector with the axis of said quarter-wave plate making an angle of 45° with said axes of polarization, and, before removing said quarter-wave plate from said position thereof in front of the projector, holding in front of the eyes of the operator a second quarter-wave plate whose axis is perpendicular to that of said first-mentioned quarter-wave plate so that the operator can align said images.

14. In a stereoscopic image-projecting system, in combination, a projector for projecting a pair of stereo images, said projector including a first polarizing means for producing a first pair of polarized beams, so that the stereo images when properly superimposed on a screen or the like can be viewed through a second polarizing means; and movable means movable to and from a position located in the path of said first polarized beams, said movable means when in said position thereof altering said first polarized beams to present to the viewer unintelligible images while maintaining substantially the same ratio between the intensities of a second pair of beams and said first pair of polarized beams, so that images projected by said second pair of beams, into which said first pair of beams are respectively altered by said movable means, can be aligned by the operator and then viewed by the viewer after said movable means is moved away from said position thereof.

References Cited by the Examiner

UNITED STATES PATENTS

| | | | |
|---|---|---|---|
| 2,811,077 | 10/57 | Wiemer et al. | 88—16.6 |
| 2,878,719 | 3/59 | Lutes | 88—31 X |
| 2,928,316 | 3/60 | Castellana | 88—26 |

FOREIGN PATENTS 887,644   8/43   France.

NORTON ANSHER, *Primary Examiner.*

WILLIAM MISIEK, *Examiner.*